No. 735,197. PATENTED AUG. 4, 1903.
V. G. BARR.
TOOL FOR CUTTING ELLIPTICAL OR OTHER CURVED PICTURE MATS, STENCILS, &c.
APPLICATION FILED AUG. 2, 1902.

NO MODEL. 2 SHEETS—SHEET 1.

Witnesses
Harriet E. Barr
Edward A. Thompson

Victor G. Barr
Inventor

By his Attorneys
Redding, Kiddle & Greeley

No. 735,197. PATENTED AUG. 4, 1903.
V. G. BARR.
TOOL FOR CUTTING ELLIPTICAL OR OTHER CURVED PICTURE
MATS, STENCILS, &c.
APPLICATION FILED AUG. 2, 1902.

NO MODEL. 2 SHEETS—SHEET 2.

No. 735,197. Patented August 4, 1903.

UNITED STATES PATENT OFFICE.

VICTOR G. BARR, OF NEW ROCHELLE, NEW YORK.

TOOL FOR CUTTING ELLIPTICAL OR OTHER CURVED PICTURE-MATS, STENCILS, &c.

SPECIFICATION forming part of Letters Patent No. 735,197, dated August 4, 1903.

Application filed August 2, 1902. Serial No. 118,073. (No model.)

*To all whom it may concern:*

Be it known that I, VICTOR G. BARR, a citizen of the United States, residing in New Rochelle, county of Westchester, State of New York, have invented certain new and useful Improvements in Tools for Cutting Elliptical or other Curved Picture-Mats, Stencils, &c., of which the following is a specification, reference being had to the accompanying draw10 ings, forming a part hereof.

The object of this invention is to produce an improved tool or appliance for cutting elliptical, circular, and other curved picture-mats, stencils, &c. Machines for this pur15 pose have been devised heretofore; but they are complicated, expensive, and not generally capable of universal use. They generally require a special table, and the material to be cut must be reduced to suitable dimensions for introduction into the machine. The improved appliance wherein this invention consists, on the contrary, is inexpensive to manufacture, comparatively simple in construction, can be applied to any ordinary work ta25 ble or bench, and can be used to cut many forms from a single large sheet, thereby economizing material and avoiding the necessity of preliminary cutting.

The invention will be fully described here30 inafter with reference to the accompanying drawings, in which it is illustrated, and in which—

Figure 1:
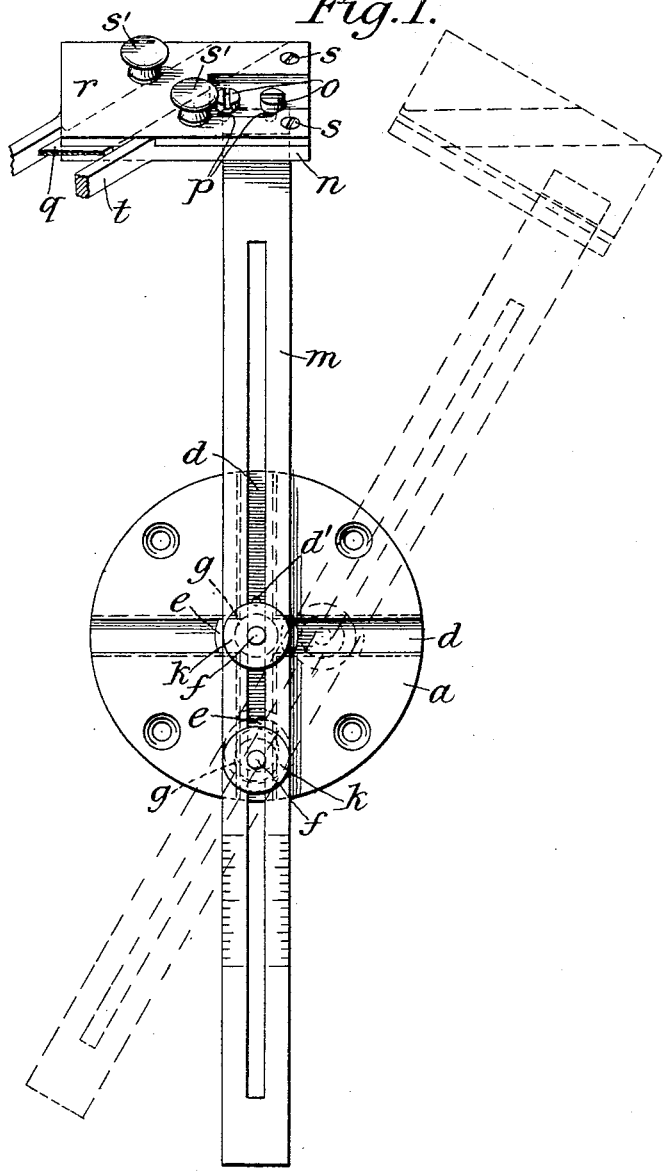
Figure 2:
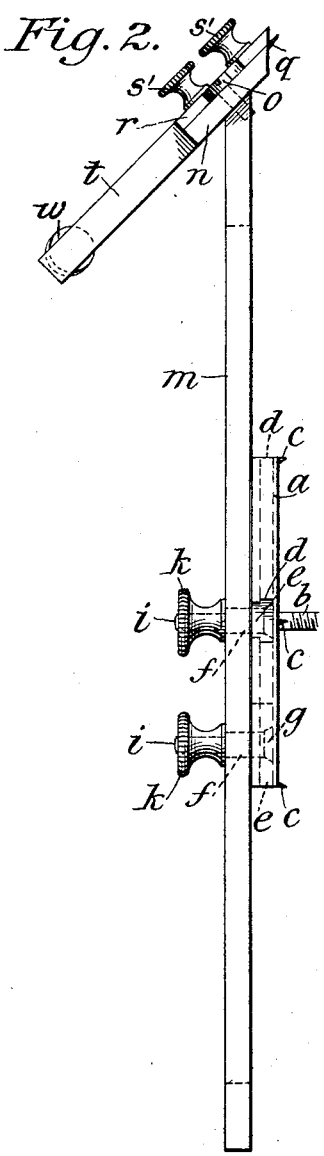
Figure 3:
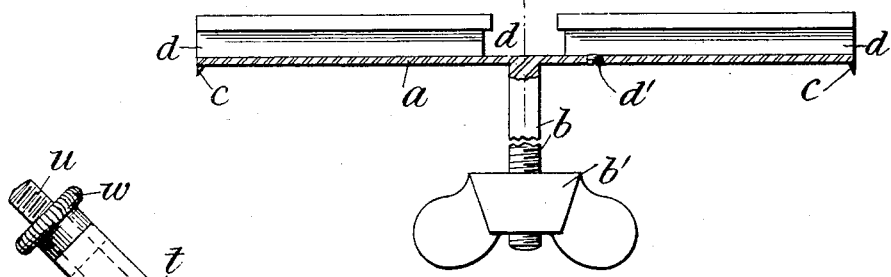
Figure 4:
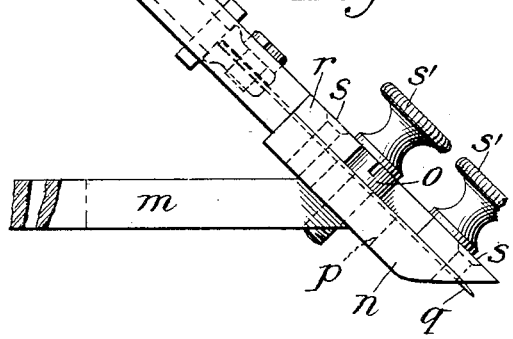
Figure 5:
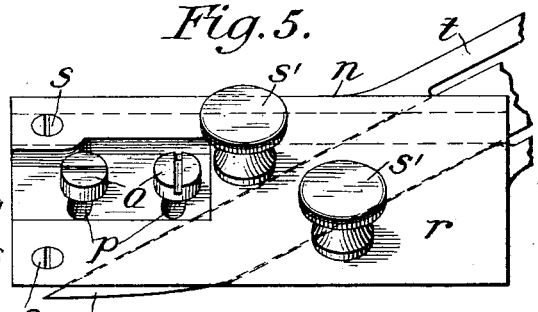
Figure 7:
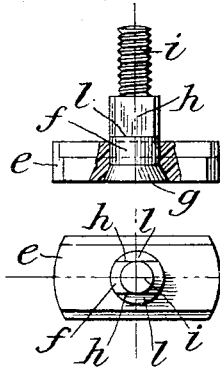
Figure 8:
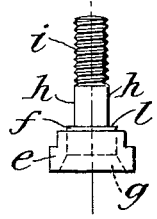
Figure 6:
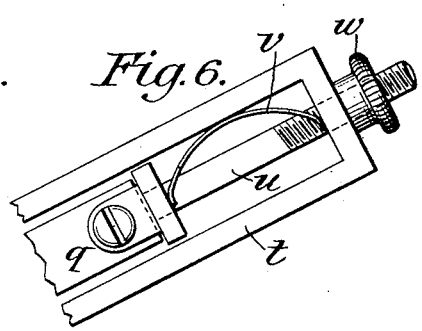
Figure 9:
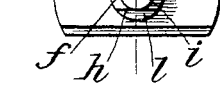

Figure 1 is a plan view of the improved tool or appliance arranged for cutting an ellipse, the knife-adjusting devices being broken off. Fig. 2 is a side elevation of the improved tool. Fig. 3 is a sectional view of the base in the plane of one of the grooves. Fig. 4 is a detail view of a portion of the beam, showing par40 ticularly the construction of the knife holding and adjusting devices. Fig. 5 is a detail plan view of the knife-holding devices. Fig. 6 is a detail plan view of the knife-adjusting devices. Fig. 7 is a view, partly in vertical section and partly in elevation, of one of the sliding blocks with its pin, Fig. 8 being an end view, and Fig. 9 a plan view, of the same.

The base $a$ of the tool or appliance may be of any suitable form and is preferably a substantial plate of metal having extended from its under side a bolt $b$, adapted to be inserted through a hole in the work table or bench and to receive a wide-based wing-nut $b'$, by which the base may be firmly secured in position on the table or bench. The under side may also be provided with short spikes $c$ to engage and firmly hold the material to be cut. In the upper side of the base are formed two undercut or dovetailed grooves $d$ at right angles to each other to receive the sliding blocks, hereinafter referred to, and in the base-plate eccentric to the intersections of the grooves $d\ d$, but entering one of said grooves, is a set-screw $d'$, adjustable from the under side to engage one of said sliding blocks for a purpose hereinafter mentioned. Engaging each of the grooves $d$ is a sliding block $e$, adapted to move with a sliding fit in the groove and supporting a stud $f$. This stud preferably turns freely in the block and may be provided at its lower end with an enlargement-head $g$, which is countersunk in the under side of the sliding block. Above the block the stud has flat sides $h$, while the upper end $i$ of the stud is threaded to receive a clamping thumb-nut $k$. A slotted beam $m$ is adapted to engage the studs $f$, having a sliding fit on the flattened sides $h$ and being adapted to be clamped to the studs by the thumb-nuts $k$, bearing against shoulders $l$, formed by the cylindrical portions of the studs.

At one end the beam $m$ bears the cutter, the knife-carrying devices preferably comprising a head $n$, which is held against the beveled end of the beam by screws $o$, which pass through slots $p$ into the beam, the slots providing for adjustment of the cutter-head $n$ with reference to the beam, while the screws are removable in order to permit the cutter-head to be reversed on the beam when the beam is reversed on the base in order that the material may be cut either with an inward or an outward bevel, as may be desired. At the other end the beam will bear the cutter-head at right angles with the beam, so as to cut without bevel. The cutter head or plate $n$ is grooved, as indicated by dotted lines in Fig. 5, to receive and guide the knife $q$, and a cover-plate $r$ is applied to the cutter-head and secured by screws $s$ and $s'$ to clamp the knife in adjusted position when so desired. It is desirable, however, to provide also for automatic feed of the knife, and for this purpose a bridle $t$ is secured to the cutter-head to afford a guide for the shank $u$ of the knife, a spring $v$, preferably a bow spring, being interposed between the head of the bridle and a shoulder on the knife to thrust the knife forward. A thumb-nut $w$ is also applied to the threaded shank $u$ outside of the bridle in order to limit the forward or downward movement of the knife. By this means the knife will be fed forward to the extent limited by the nut $w$ by spring-pressure, thereby producing a smooth and even cut, overcoming irregularities in the work-bench and variation in thickness of the material, without dragging the material, the knife being moved through its path repeatedly until the material is cut through.

When the tool or appliance is to be used for cutting an ellipse of given proportions, the traveling studs $f$ are clamped to the beam at the proper points, as determined by the graduated scales upon the beam, and the cutter-head is then swung around the base with the knife bearing on the material, the sliding blocks $e$, carrying the studs $f$, sliding meanwhile in their respective grooves $d$, so that the path described by the knife will be a true ellipse. It will be obvious that the proportions of the ellipse can be raised at will by adjusting the studs with reference to the beam and said graduated scale, and, furthermore, that with a base of given size larger ellipses can be cut by increasing the length of the sliding blocks. If the device is to be used for cutting a circle, one of the sliding blocks is disengaged from the beam and is moved out of its groove and the other sliding block is moved until the axis of its pivot coincides with the axis of the base-plate, in which position it is held by the set-screw $d'$, this set-screw being offset from the center, so that it shall not bind the pivot-stud $f$ and also shall not interfere with the clamping-bolt $b$.

Obviously the tool or appliance may be used for cutting arcs of circles or ellipses of rectangular or other forms when so desired.

I claim as my invention—

1. A tool or appliance for cutting elliptical and other curved picture-mats, stencils, &c., comprising a base-plate having in its upper surface undercut grooves intersecting at right angles, means to secure said base-plate to a table or bench, sliding blocks mounted in said grooves respectively, pivot-studs mounted on said blocks, a slotted beam engaging said pivot-studs, means for clamping said pivot-studs to said beam, a cutter-head carried by said beam, a knife mounted in said cutter-head, a spring applied to said knife to press it forward, and means to limit the forward movement of the knife, substantially as described.

2. A tool or appliance for cutting elliptical and other curved picture-mats, stencils, &c., comprising a base-plate having in its upper surface undercut grooves intersecting at right angles, means to secure said base-plate to a table or bench, sliding blocks mounted in said grooves respectively, pivot-studs mounted on said blocks, a slotted beam engaging said pivot-studs, means for clamping said pivot-studs to said beam, a cutter-head carried by said beam and having a bridle, a knife mounted in said cutter-head and having a screw-threaded shank extended through the bridle, a spring applied to said knife to press the same forward, and a nut applied to the threaded shank of the knife and bearing against the bridle to limit the forward movement of the knife, substantially as described.

3. A tool or appliance for cutting elliptical and other curved picture-mats, stencils, &c., comprising a base-plate having in its upper surface undercut grooves intersecting at right angles, means to secure said base-plate to a table or bench, sliding blocks mounted in said grooves respectively, pivot-studs mounted on said blocks, a slotted beam engaging said pivot-studs, means for clamping said pivot-studs to said beam, a cutter-head carried by said beam and comprising a grooved plate and a clamping-plate, and a knife mounted in the grooved plate and held by the clamping-plate, substantially as described.

4. A tool or appliance for cutting elliptical and other curved picture-mats, stencils, &c., comprising a base-plate having in its upper surface undercut grooves intersecting at right angles, means to secure said base-plate to a table or bench, sliding blocks mounted in said grooves respectively, pivot-studs mounted on said blocks, a slotted beam engaging said pivot-studs, means for clamping said pivot-studs to said beam, a slotted cutter-head and screws passing through the slots of the cutter-head into the end of the beam to secure the cutter-head adjustably and reversibly on the beam, substantially as described.

This specification signed and witnessed this 3d day of July, A. D. 1902.

VICTOR G. BARR.

In presence of—
GEORGE J. P. HYATT,
HARRIET E. BARR.